UNITED STATES PATENT OFFICE.

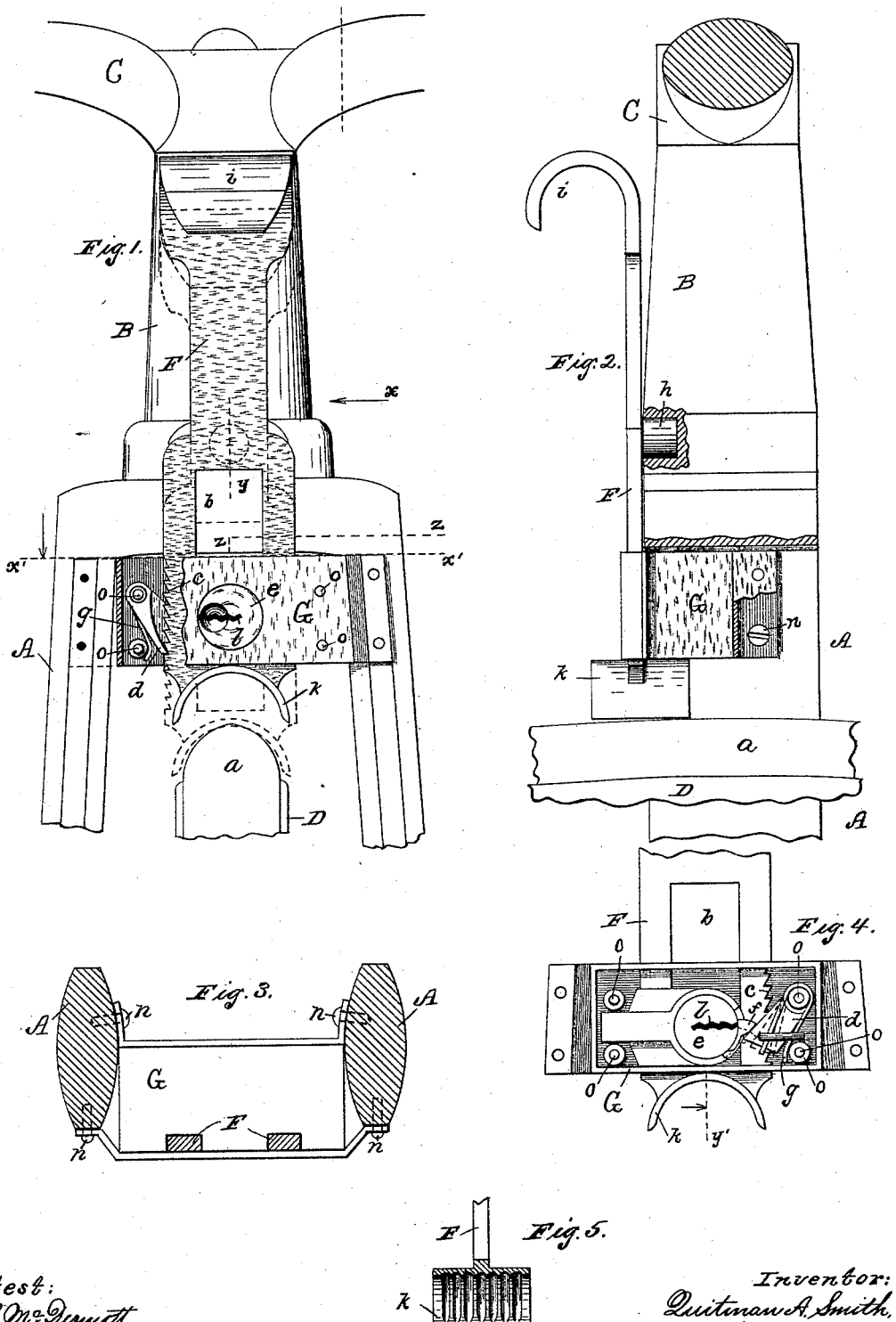

QUITMAN A. SMITH, OF ROCHESTER, NEW YORK.

BICYCLE-LOCK.

SPECIFICATION forming part of Letters Patent No. 441,857, dated December 2, 1890.

Application filed April 19, 1890. Serial No. 348,618. (No model.)

*To all whom it may concern:*

Be it known that I, QUITMAN A. SMITH, of Rochester, in the county of Monroe and State of New York, have invented a new and useful Improvement in Bicycle-Locks, which improvement is fully set forth in the following specification and shown in the accompanying drawings.

The object of my invention is to produce an improved lock for the wheels of bicycles and similar vehicles, the invention being hereinafter fully described, and more particularly pointed out in the claims.

Referring to the drawings, Figure 1 is a front view of a portion of the fork and the head of a bicycle with my improved lock in place, parts being shown in two positions by full and dotted lines and a part broken away; Fig. 2, a side elevation of the same, seen as indicated by arrow $x$, parts being centrally and longitudinally sectioned as on the dotted lines $y$ and $z\,z$, respectively, in Fig. 1, parts being broken away; Fig. 3, a horizontal section taken on the dotted line $x'\,x'$ in Fig. 1; Fig. 4, a rear view of the locking device with the rear plate omitted, parts being shown in two positions by full and dotted lines; and Fig. 5, a longitudinal section of a part of the locking-bolt, taken on the dotted line $y'$ in Fig. 4.

Referring to the parts, A is a part of the fork or frame of a bicycle, B the head, C the handle-bars, and D the wheel, all of common make or kind.

My improved lock for the wheel is shown in the drawings as attached to the fork and in front of the head; but in different makes or kinds of velocipedes it may be attached to any other convenient part of the frame in position to engage one of the wheels.

The device consists, essentially, of a locking-bolt F to press against or engage the india-rubber tire $a$ of the wheel, with an inclosed or inaccessible catch or holder to hold it in place against the wheel, and a lock proper operated by a key to release the locking-bolt and allow it to be withdrawn from the wheel when it is wished to unlock the bicycle. The locking-bolt, as shown, is formed with notches $c$ at one edge, and a spring-pressed pawl or holder $d$ is provided to enter the notches. This pawl allows the bolt to be moved in a direction toward or against the wheel, but prevents it being moved in the opposite direction or away from the wheel.

The movable barrel or body $e$ of the lock is formed with a tooth or projection $f$ in position to bear against the pawl, as shown in Fig. 4, so that when the barrel is turned by means of a key inserted in the key-hole $l$ the pawl is forced out of the notch against the action of the spring $g$. This releases the bolt F and allows it to be drawn upward away from the wheel to release the latter. A piece of india-rubber or similar material $h$ is inserted in the head B in position to bear against the bolt, which acts as a tension to prevent the bolt from moving downward against the wheel on account of the jarring of the bicycle while in use. Any suitable tension not involving invention may be used in place of the india-rubber mass $h$—as, for instance, a slender metal spring—between the bolt and the head B.

The bolt F may of course be of any suitable form and provided at its upper end with a head $i$ of any convenient form to be operated by the hand. As shown, it is made in the form of a hook, which constitutes a finger-rest, by means of which to raise it to unlock the wheel. The lower end of the bolt is formed with a curved foot $k$ to meet and press the tire, as shown, the inner surface of the foot being corrugated, as shown in Fig. 5, to enable it to more firmly hold the wheel.

As shown in the drawings, a Yale lock with tumblers and operated with a corrugated key is used to operate the pawl or holder $d$ for the bolt; but any other suitable lock may be employed for the purpose. The bolt, as shown, is formed with a slot $b$ to avoid contact with the part $e$, the latter part, with the pawl $d$ and spring $g$, being inclosed in an inclosure G, through which the bolt F slides, as shown, the notched part of the latter being within the inclosure.

The design of the lock is to prevent the vehicle when temporarily left standing from being rolled away by unauthorized persons and to take the place of the cumbersome padlock and chain commonly used for the purpose.

This lock forms a permanent attachment of the bicycle.

When the vehicle is to be left standing in an exposed place, the rider presses the locking-bolt firmly down against the wheel and the pawl holds it in place. When it is wished to use the bicycle, the key is inserted in the barrel of the lock and turned to disengage the pawl, as above described. This releases the bolt, which is lifted by the finger away from the wheel, when the bicycle is free to move.

As shown, the lock is held to the frame of the vehicle by simple screws $n$ passed through the front and rear plates of the inclosure G; but it may be formed to fit any convenient part of the frame and be held by other simple and well-known means—as by rivets, for instance—this not being essential to my invention. When the pawl is thrown back by the barrel $e$ to release the locking-bolt, it encounters a stud $o$, Figs. 1 and 4. This forms a stop for the pawl and prevents the tooth from passing beyond the end of the pawl. The stud $o$ is one of four which serve to hold the parts of the inclosure G together, the pawl being held by one of them.

What I claim as my invention is—

1. In a bicycle-lock, a rigid toothed locking-bolt to bear against the wheel, a pawl to engage the teeth of the bolt, and a detent $h$, bearing against the bolt to moderately resist the motion thereof, the bolt being held in bearings rigid with the fork of the machine, as shown.

2. In a bicycle-lock, the fork or frame of the vehicle, in combination with an inclosing-case held by said fork or frame, a locking-bolt to engage the wheel held by said inclosing-case and formed with an opening within said case, a holder for the bolt, and a barrel or part within said opening in the locking-bolt operated by a key to disengage the holder from the bolt, substantially as shown and described.

In witness whereof I have hereunto set my hand, this 10th day of April, 1890, in the presence of two subscribing witnesses.

QUITMAN A. SMITH.

Witnesses:
E. B. WHITMORE,
M. L. McDERMOTT.